Patented June 3, 1924.

1,496,675

UNITED STATES PATENT OFFICE.

JAMES COLQUHOUN IRVINE AND WALTER NORMAN HAWORTH, OF ST. ANDREWS, SCOTLAND, ASSIGNORS, BY MESNE ASSIGNMENTS, TO CARBIDE AND CARBON CHEMICALS CORPORATION, OF NEW YORK, N. Y., A CORPORATION OF NEW YORK.

MANUFACTURE OF HALOGEN HYDRINS.

No Drawing. Application filed February 2, 1918. Serial No. 215,138.

*To all whom it may concern:*

Be it known that we, JAMES COLQUHOUN IRVINE and WALTER NORMAN HAWORTH, subjects of the King of Great Britain, both residing at St. Andrews, Fife, Scotland, have invented certain new and useful Improvements in and Relating to the Manufacture of Halogen Hydrins, of which the following is a specification.

This invention relates to a process for the preparation of halogen hydrins, especially chlorhydrins or bromhydrins and/or alkyl halogen or other substituted derivatives of chlorhydrins or bromhydrins. To this end a compound containing an ethylene linkage such as ethylene, or a substituted ethylene or other suitable unsaturated body is caused to interact with for example hypochlorous acid in a manner hereafter described.

The invention broadly consists in causing the accumulation of halogen hydrins within a liquid medium preferably an aqueous medium by the continued action of a hypohalogenous acid upon an unsaturated body, more particularly upon an unsaturated hydrocarbon of the ethylene series. The best method of causing this accumulation by such continued action is alternately to generate the hypohalogenous acid in an aqueous solution and then to cause the unsaturated body to react therewith in such manner that after a repetition of these alternate reactions a relatively strong solution of halogen hydrin is obtained. The invention is particularly valuable for preparation of glycol chlorhydrin and it includes means for the isolation of this product from the reaction mixture.

We will first describe a preferred form of the invention.

We first obtain an aqueous solution of hypochlorous acid (see United States Patent No. 1227049). This may be obtained in the following manner. We pass chlorine into a vessel containing water and copper oxide or a copper salt preferably chloride or oxychloride. The process is aided by shaking or stirring mechanically so as to expose continuously or occasionally a fresh surface of the liquid to the chlorine; if desired the chlorine may be bubbled through the liquid but this is not essential. In this way a solution of approximately 1% of hypochlorous acid is obtained.

The solution of hypochlorous acid obtained in this or any other manner is placed in a vessel having suitable inlet and outlet tubes, for the ingress of unsaturated gas or vapor such as ethylene or of other unsaturated hydrocarbon derivative, and the egress of waste products.

This vessel is so manipulated that the contents may be agitated so as to promote reaction during the admission of the gases or vapours. Devices for the prevention of gas locking are provided in the form of taps or the like, which permit of the removal of any inert gaseous atmosphere, and the substitution of a continuous supply of vapour or gas of the unsaturated hydrocarbon or derivative. Efficient control of the process is obtained by having pulsometers conveniently arranged or other device such as pressure gauges so as to indicate the rate of absorption of the gas or vapour as judged by the speed at which the gas bubbles into the vessel or one of the vessels through which the unsaturated vapours are passed. When the reaction diminishes, means may be provided for the substitution for the atmosphere of unsaturated hydrocarbon or derivative of air or other neutral gas, and then of a halogen such as chlorine if this should be necessary for the generation of a further supply of hypochlorous acid, the shaking or agitating being continued meanwhile.

After the removal of the atmosphere of halogen or any other gas by the passing of a rapid stream of air while both inlet and outlet tubes are opened, the unsaturated substance is again admitted, the outlet tap closed, and the additive compound in the form of a chlorhydrin thus accumulates. By alternating for example, the passing of chlorine in presence of a suitable catalyst and of unsaturated gases or vapours, a continuous process for the preparation of a chlorhydrin is possible.

Instead of conducting the generation of hypochlorous acid and its subsequent ethylenation in one chamber or vessel, separate compartments or vessels may be provided for each of these reactions. For instance, one or more of the vessels previously described can be reserved for the chlorination stage, and other vessels used exclusively for the combination with ethylene. In this case the removal of the atmosphere of either chlorine or ethylene at the end of the operations is avoided, and thus the air current is not used, but instead of this procedure the liquor itself must be transferred from the chlorinating vessel to the vessel reserved for ethylene absorption, and after this stage is complete the liquor can be passed back again to the chlorinating vessel to receive further treatment. For the transference of liquid from chlorinator to ethylenator any mechanical device may be used which effects the purpose, or the liquid may be blown over by having the chlorine and ethylene gases at two pressures, the higher pressure being used for the transference of liquor and the lower as a feed for the gases undergoing absorption.

A device such as glass bell, with outlet and inlet pipes at the bottom, interposed between the emptying and filling vessel, serves to prevent gas bubbles passing over with the liquid during its transference, since the bubbles, which may accidentally come over with the stream of liquid, rise to the top of the bell and lodge there until released by opening a tap at the top of the bell, whilst the liquor passes on through the lower egress pipe to the filling chamber.

The isolation of the product may be effected by extraction with an organic solvent, such as ether, chloroform, ethylene dichloride etc. The extraction may be carried out on the original liquor or on the steam distillate from this. In the preparation of glycol chlorhydrin from ethylene, the process has been found especially sucessful, a yield of 40 grammes, per litre of solution, being readily obtained along with ethylene dichloride and occasionally acetylene tetrachloride as by-products. If however the hydrochloric acid (also formed) is neutralized from time to time, for instance with basic copper carbonate, (thus also serving the purpose of supplying fresh catalyst) it is possible to obtain a solution containing a considerably higher concentration of chlorhydrin.

The separation of the glycol chlorhydrin may also be effected in the following manner. This body has been found to give a constant boiling mixture with water which at ordinary barometric pressures boils at 97° C., containing about 43% of chlorhydrin. If therefore a product containing say 15% is carefully fractionated using an efficient stillhead, it is possible in two distillations to obtain a product containing 43% of glycol chlorhydrin.

When the glycol chlorhydrin is distilled, it is advisable to avoid corks and rubber connections as the chlorhydrin has a very corrosive action on them. If the aqueous solution is fractionated as above described after removal of hydrochloric acid, the operation may be conducted in iron vessels if a body such as marble chippings, whiting etc. is added to neutralize any hydrochloric acid which may be formed during the distillation.

In the preparation of bromhydrins the bromine may be introduced as vapour or added to the aqueuos liquor in the liquid form the same catalysts are employed e. g. copper salts but copper bromide is preferable.

In describing one form of our invention, we give the following illustration of an actual test as carried on by us.

From 80 to 100 grammes of a copper salt such as copper chloride, or 25 grams of an oxy-chloride of copper, are placed in a 6 litre doubly tubulated bottle or jar containing 1¾ litres of water. Sixteen such bottles are manipulated at one time on a shaking machine.

The inlets to the bottles are all connected to a common feed through which chlorine, air and ethylene may in turn be admitted.

The first stage is passing gaseous chlorine from a reservoir of liquid chlorine under suitable control into the inlet tubes of the series of bottles or jars, until hypochlorous acid ceases to be rapidly formed. During this process, the shaking machine is kept in motion, and therefore a fresh surface of the aqueous solution continues to be exposed to chlorination. Our experience has been that absorption is very rapid at first, and that the reaction slows down gradually until, after a period of half an hour, it is practically complete. Scarcely any heating effect is observed as the result of this or of the subsequent reaction.

The remaining atmosphere containing chlorine is now removed from the reaction vessel by turning off the jet of chlorine, and passing air through the vessels in order to sweep out the excess of chlorine, a second tubulure situated on the side of the bottle serving as a means of exit for waste gases.

This operation is complete in the course of a few minutes, and meanwhile the bottles are kept stationary. Care must be taken that the stream of air is not too vigorous, and is not too long continued. It need not bubble through the liquid, but merely pass over its surface, as otherwise loss of hypochlorous acid might occur.

The ethylene gas prepared by any known process is supplied from a large storage gas holder so that a pressure of 1½ atmospheres can be obtained (a lower pressure is required for other modifications of the process). It has been found in practice that a few minor difficulties are encountered before the absorption of the ethylene takes place at all vigorously. These are easily overcome by the following simple devices.

All the air must be removed from the vessels by passing a rapid stream of ethylene gas for a few seconds through each bottle in turn.

The supply of ethylene is then discontinued, and the shaker set in motion with the result that a slight pressure is set up in each bottle, due possibly to a little chlorine being expelled from the solution by the agitation of the liquid. The shaking machine is then stopped, and this pressure released by opening the tap connected with the waste pipe, and this is done to each bottle in turn, and the shaker again set in motion, or instead the agitation can be carried out for some minutes with both inlet and outlet taps closed, when the internal pressure is found to disappear. After three such treatments the absorption of the ethylene becomes very vigorous, and continues for about 1½ hours, during which time the shaking machine is kept in constant motion.

At the end of this time, the operation appears to be approximately complete, and the remaining atmosphere of ethylene is removed by air being passed through the inlet tubes as before, while the outlet tubes remain open.

In this way we have been able to make as many as nine chlorinations on the same charge in one day, following by the absorption of a corresponding amount of ethylene.

In this way glycol chlorhydrin accumulates in aqueous solution until a maximum is reached e. g. 40 grammes of glycol chlorhydrin to the litre of water unless the hydrochloric acid is neutralized as above described when a higher concentration is obtained.

The glycol chlorhydrin is now separated from the solution of copper salts e. g. by fractionation or by means of ether or other convenient solvent, or the steam distillate may be similarly extracted instead of the original copper solution, and as most of the ether is recoverable, it may be used repeatedly for the same operation without very material loss. A continuous extraction process may be used if desired.

This emptying of the vessels is facilitated by fixing a siphon tube into the bottle, and then turning on the air blower so that the increase of internal pressure forces over liquid through the siphon into a suitable receptacle. The ethereal or other extracts are collected carefully, concentrated by distilling off the ether etc., in a water bath and the concentrated ethereal solution dried over anhydrous potassium carbonate. After standing for several hours the ethereal solution is filtered from the drying agent and distilled off completely, leaving a residue of crude chlorhydrin, which is then afterwards fractionated.

The last traces of ether in the aqueous residues are got rid of by evaporating the ether on a rapidly boiling water bath and allowing the aqueous solutions afterwards to cool down. This aqueous solution may serve again for recharging the bottles in place of the original solution of copper chloride used. The copper solutions can be used over and over again, provided precautions be taken to avoid contamination with extraneous substances, and provided the acid present is neutralized with basic copper carbonate.

Special care should be taken to avoid all trace of ether vapour, for instance in the ethylene, as the presence of ether appears to lead to violent explosions during chlorination.

The crude chlorhydrin from the foregoing process may be collected in four fractions (1) up to 100 degrees, (2) 100 to 120 degrees, (3) 120 to 126 degrees, (4) 126 degrees to 131 degrees. There is also a slight residue of higher boiling point containing the higher chlorinated derivatives of ethane.

Fraction 1 is mostly ether and ethylene dichloride, which latter is a by-product.

Fractions 2, 3 and 4 contain principally glycol chlorhydrin contaminated to a greater or lesser extent with ethylene dichloride. These impurities may be removed from all the fractions by shaking with petroleum ether, in which they are readily soluble, while the chlorhydrin remains as a separate layer. Before carrying out this separation with fractions 2 and 3 they should be redistilled in a fractionating apparatus and the portion boiling at 126–131° shaken with petroleum ether. Subsequently the layer of chlorhydrin is dried and rectified, when the compound distils constantly at 128 to 130 C., and shows a refractive index of 1.4450.

It will be seen that our process is particularly effective if the unsaturated body is introduced in the form of a vapour or gas. In some cases however even a liquid unsaturated body may be used provided efficient means of distribution are provided e. g. thorough agitation; the liquid may be introduced as a fine spray.

Instead of working with a static body of liquid we may cause the liquid to be agitated, or exposed, in a finely divided form alternately within two reaction zones filled with chlorine and unsaturated gas or liquid respectively. Thus a pair of towers, packed with rings or any form of baffling material presenting a large surface or other distributing device enabling a large surface of liquid to be exposed, may be employed whose dimensions and mode of packing are so chosen that the hypochlorous acid can be produced in concentration of say ½ to 2 per cent, and that the addition of the unsaturated body also occurs readily. The liquid may be caused to circulate down the tower and returned to a feed cistern on top by an elevator or pump, or egg using compressed gas (air chlorine etc.) or the liquid may be passed upwards through a tower which is packed with a filling material or baffling so contrived as to promote prolonged contact between gas and liquid, or other device to promote solution of the gases in the liquid. In such a case the gas is allowed to bubble through the liquid. The liquid is then circulated in the other tower, or series of towers. The gas may be kept at the desired pressure by controlling an admission valve. The liquid will be fed into the tower, and withdrawn therefrom through lutes. Or one or more towers may be used provided with valves for alternate admission of the gases.

When the previous method is employed a scrubber or catch tower may be used to receive the gases blown out of the vessels or towers, to generate chlorydrin from the gases which would otherwise be wasted.

We declare that what we claim is:—

1. The process of preparing glycol chlorhydrin which comprises passing chlorine into water containing a copper compound as catalyst, then passing in ethylene and repeating these operations till a relatively strong solution of chlorhydrin is obtained.

2. The process of preparing chlorhydrins which comprises circulating an aqueous liquid containing a catalyst capable of promoting the formation of hypochlorous acid from chlorine and water through a series of vessels in at least one of which it comes in contact with chlorine and in at least one of which it comes in contact with an olefinic body until a relatively strong solution of chlorhydrin is obtained.

3. The process of preparing chlorhydrins which comprises circulating an aqueous liquid containing a catalyst capable of promoting the formation of hypochlorous acid from chlorine and water through a series of vessels in at least one of which it comes in contact with chlorine and in at least one of which it comes in contact with ethylene until a relatively strong solution of chlorhydrin is obtained.

4. In the process of preparing glycol chlorhydrin by accumulation within an aqueous medium the step which comprises concentrating the chlorhydrin by fractionating to separate the constant boiling mixture of 43% glycol chlorhydrin and 57% water boiling at about 97° C. at 760 millimeters barometric pressure.

5. In the process of preparing glycol chlorhydrins by accumulation within an aqueous medium the step which comprises adding a basic substance to keep the liquid neutral so that it can be distilled in iron vessels.

6. In the process of preparing halogen hydrins by accumulation thereof within an aqueous medium by continued interaction of hypohalogenous acid and an unsaturated body, the step which consists of adding a basic substance to neutralize the halogen acid formed during the reaction and so to obtain a stronger solution of halogen hydrin.

7. In the process of preparing chlorhydrins by the accumulation thereof within an aqueous medium containing a catalyst capable of promoting the formation of hypo-chlorous acid from chlorine and water by alternately introducing chlorine and an unsaturated body, the step which consists in adding a basic substance to neutralize the hydrochloric acid formed in the reaction and thus to increase the possible strength of chlorhydrin.

8. In the process of preparing chlorhydrins by the accumulation thereof within an aqueous medium containing a catalyst capable of promoting the formation of hypochlorous acid from chlorine and water, by alternately introducing chlorine and an unsaturated body, the step which consists in adding basic copper carbonate to neutralize the hydrochloric acid formed in the reaction and thus to increase the possible strength of chlorhydrin.

9. A process for the manufacture of chlorhydrins in which hypochlorous acid and an olefinic body are repeatedly supplied to an aqueous reaction medium until the chlorhydrin has accumulated in solution to a substantial extent.

10. A process for the manufacture of chlorhydrins in which hypochlorous acid and an olefinic body are caused to undergo continued interaction until the chlorhydrin has accumulated to a considerable extent while the concentration of the hypochlorous acid and the unsaturated body are maintained at a low amount.

11. The process of making chlorhydrins, which consists in preparing a mixed solution of hypochlorous acid and a salt of a weak acid which will react with hydrochloric acid but not with hypochlorous acid, contacting an unsaturated hydrocarbon in gaseous state with said mixed solution, whereby chlorhydrin and a soluble chloride are formed, and finally separating the chlorhydrin from the solution containing the soluble chloride.

12. The method of making chlorhydrin, which consists in absorbing in water first chlorine and then ethylene, and adding a mild neutralizing agent adapted to react with hydrochloric, but not with hypochlorous acid formed during such absorption.

13. The process of making chlorhydrins of unsaturated hydrocarbons which consists in subjecting such hydrocarbons under pressure greater than atmospheric. to the action of a weak aqueous solution of hypochlorous acid.

14. The process of making chlorhydrins of unsaturated hydrocarbons which consists in subjecting such hydrocarbons under pressure greater than atmospheric to the action of a week aqueous solution of hypochlorous acid, and maintaining the supply of hypochlorous acid and of such hydrocarbon to the zone of reaction.

15. The process of making chlorhydrins of the olefines, which consists in alternately charging a solution with hypochlorous acid and contacting it under pressure greater than atmospheric with an olefine in gaseous state, thereby removing the hypochlorous acid and forming chlorhydrin, repeating this alternation of steps until the concentration of chlorhydrin in the solution has reached the desired point, and finally recovering the chlorhydrin from the solution.

16. A process for the preparation of halogen hydrins in which hypohalogenous acid and ethylene are repeatedly supplied to a reaction medium until the halogen hydrin has accumulated to a substantial extent.

17. A process for the preparation of chlorhydrin in which hypochlorous acid and ethylene are repeatedly supplied to an aqueous medium until the chlorhydrin has accumulated to a substantial extent.

18. A process for the manufacture of chlorhydrin in which a solution of hypochlorous acid and an unsaturated hydrocarbon in gaseous state are repeatedly supplied to a material capable of reacting with hydrochloric acid but not with hypochlorous acid.

In witness whereof, we have hereunto signed our names this 11th day of January 1918, in the presence of two subscribing witnesses.

JAMES COLQUHOUN IRVINE.
WALTER NORMAN HAWORTH.

Witnesses:
ALLAN BASTER.
SUSAN H. S. LOW.